United States Patent
Pestoni et al.

(10) Patent No.: US 8,578,157 B2
(45) Date of Patent: Nov. 5, 2013

(54) SYSTEM AND METHOD FOR DIGITAL RIGHTS MANAGEMENT WITH AUTHORIZED DEVICE GROUPS

(75) Inventors: Florian Pestoni, Mountain View, CA (US); Sunil C. Agrawal, Milpitas, CA (US); Pritham Shetty, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 629 days.

(21) Appl. No.: 12/475,317

(22) Filed: May 29, 2009

(65) Prior Publication Data
US 2013/0124859 A1 May 16, 2013

(51) Int. Cl.
*H04L 29/06* (2006.01)

(52) U.S. Cl.
CPC .................................. *H04L 63/065* (2013.01)
USPC .......................................................... 713/163

(58) Field of Classification Search
USPC ...................... 726/27–29; 713/163
See application file for complete search history.

(56) References Cited

U.S. PATENT DOCUMENTS

| | | | |
|---|---|---|---|
| 5,592,552 A | 1/1997 | Fiat | |
| 5,910,987 A | 6/1999 | Ginter et al. | |
| 6,856,976 B2 | 2/2005 | Bible, Jr. et al. | |
| 6,873,976 B2 | 3/2005 | Bible, Jr. et al. | |
| 7,434,048 B1 | 10/2008 | Shapiro et al. | |
| 7,769,177 B2 * | 8/2010 | Son et al. | 380/281 |
| 2002/0013772 A1 * | 1/2002 | Peinado | 705/51 |
| 2002/0019944 A1 * | 2/2002 | Kou | 713/200 |
| 2002/0059522 A1 * | 5/2002 | Hirano et al. | 713/193 |
| 2003/0105956 A1 * | 6/2003 | Ishiguro et al. | 713/158 |
| 2004/0162782 A1 | 8/2004 | Bible, Jr. et al. | |
| 2005/0097061 A1 | 5/2005 | Shapiro et al. | |
| 2007/0294178 A1 * | 12/2007 | Pinder et al. | 705/57 |

OTHER PUBLICATIONS

U.S. Appl. No. 12/027,981.
U.S. Appl. No. 11/000,637.

* cited by examiner

*Primary Examiner* — Peter Shaw
(74) *Attorney, Agent, or Firm* — Wolfe-SBMC

(57) ABSTRACT

Various embodiments of a system and method of digital rights management with authorized device groups are described. Various embodiments may include a system including a digital rights management (DRM) component configured to receive a private key of an authorized device group. In various embodiments, the receipt of the private key of the authorized device group may indicate the system is an authorized member of a group of devices permitted to access content items protected by a common public key associated with the authorized device group. In various embodiments the DRM component may be configured to, for each given content item of multiple content items that are encrypted with different content keys, decrypt an encrypted content key from the given content item with the private key of the authorized device group and decrypt content from the given content item with the decrypted content key.

26 Claims, 9 Drawing Sheets

SYSTEM AND METHOD FOR DIGITAL RIGHTS MANAGEMENT WITH AUTHORIZED DEVICE GROUPS

BACKGROUND

1. Field of the Invention

The present invention is directed to computer systems. More particularly, it is directed to digital rights management within a computing environment.

2. Description of the Related Art

In prior years it would not be uncommon for an individual to obtain content (e.g., literary works, periodicals, music, and movies) from a retail location in the form of a physical medium. For example, an individual might travel to a local bookstore and purchase written works in the form of a book, newspaper, or magazine. In another example, an individual might purchase music stored on a Compact Disc (CD) or a motion picture stored on a Digital Video Disc (DVD). In recent years the ubiquity of the Internet and the World Wide Web has paved the way for alternative methods of obtaining content. For example, a user might log on to a music retailer's website and download a digital version of a music album. In other example, a user might log on to a movie subscription provider's website to download or stream a motion picture to view on a personal computer. In the case of books, a user might log on to a bookseller's website and download an electronic book ("e-book") for view on a computer system, such as a desktop computer or a handheld e-book reader.

The Internet and World Wide Web serve as a backbone for numerous file sharing mechanisms. Examples of such mechanisms include electronic mail ("email") and more advanced file distribution software, such as peer-to-peer ("P2P") file sharing applications. In many cases, such file sharing mechanisms are often utilized to distribute electronic content to individuals that are not authorized to access such content. Such distribution is likely due in part to the relative ease and anonymity of sharing files through such mechanisms. To combat unauthorized consumption of content, some content owners have adopted an approach to protecting their content known as digital rights management ("DRM"), which may include various techniques for limiting access of electronic content to authorized entities.

SUMMARY

Various embodiments of a system and method of digital rights management with authorized device groups are described. The system and method of digital rights management with authorized device groups may include a system including a digital rights management (DRM) component configured to receive a private key of an authorized device group. In various embodiments, the receipt of the private key of the authorized device group may indicate the system is an authorized member of a group of devices permitted to access content items protected by a common public key associated with the authorized device group. In various embodiments the DRM component may be configured to, for each given content item of multiple content items that are encrypted with different content keys, decrypt an encrypted content key from the given content item with the private key of the authorized device group and decrypt content from the given content item with the decrypted content key.

Various embodiments may also include implementing an authorized device group manager of an authorized device group. The authorized device group manager may be configured to receive a request for a private key of the authorized device group. In various embodiments, receipt of the request may indicate a particular system is attempting to join the authorized device group. The authorized device group manager may be configured to, based on the request, determine that the particular system is authorized to join the authorized device group, and generate a response to the request based on that determination. Such response may include a private key issued to members of the authorized device group. The private key may correspond to a public key that was utilized to encrypt multiple different content keys for respective content items accessible to said authorized device group.

Figure 1:
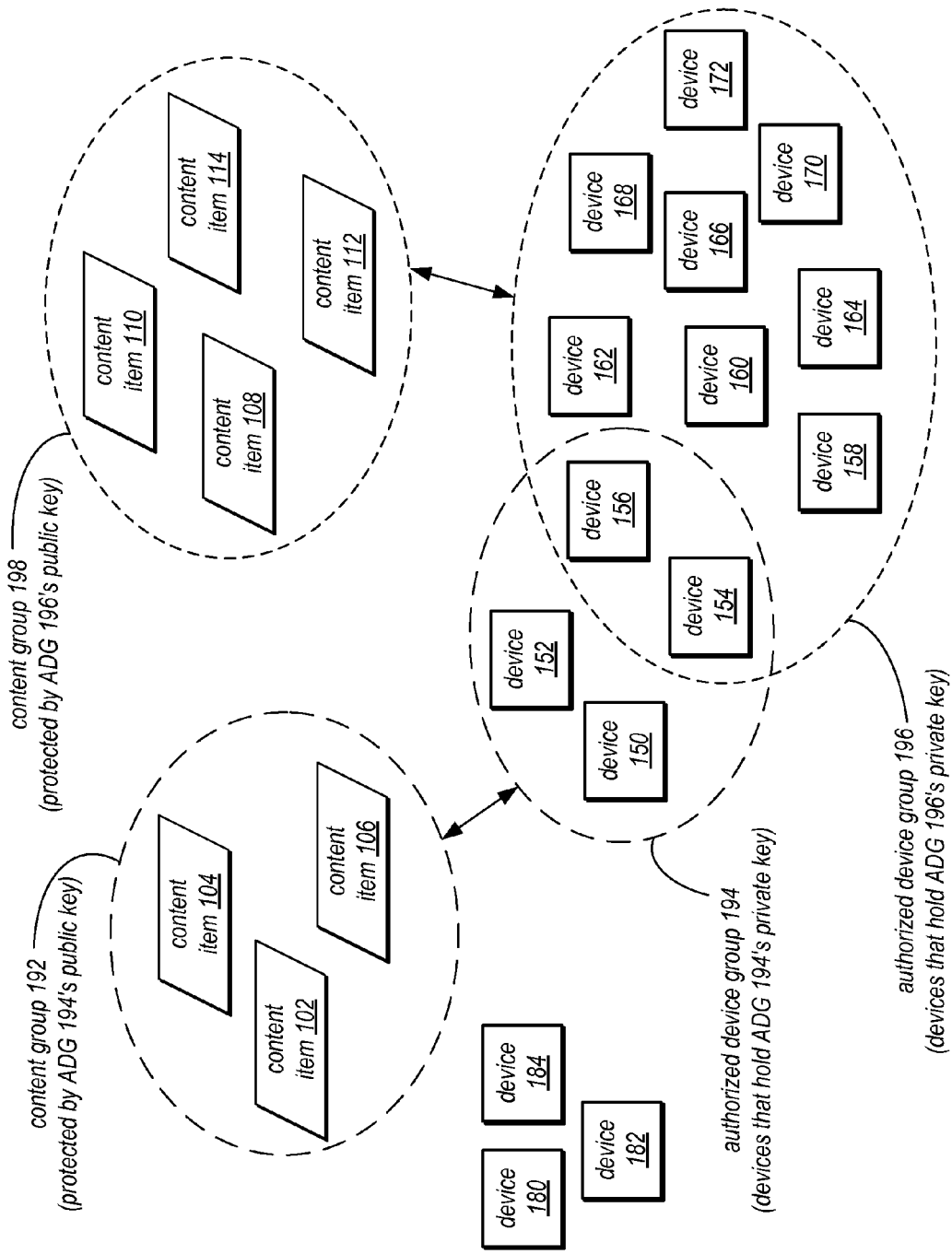
FIG. 1 illustrates a logical representation including examples of associated device groups and associated content groups, according to various embodiments.

While the system and method for digital rights management with authorized device groups is described herein by way of example for several embodiments and illustrative drawings, those skilled in the art will recognize that the system and method for digital rights management with authorized device groups is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for digital rights management with authorized device groups as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In various portions of the description presented herein, the terms "validate", "verify", "validation", "verification", "validating", and "verifying" may be used interchangeably.

DETAILED DESCRIPTION OF EMBODIMENTS

Various embodiments of a system and method for digital rights management with authorized device groups are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Note that the description presented herein may include one or more references to a one-way function or a cryptographic hash function, either of which may be referred to herein as simply a hash function. In various embodiments, the hash functions described herein may be any of various hash functions including, but not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPMED-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of any of the aforesaid hash functions.

Various embodiments include various encryption and/or decryption keys, any of which may be generated via a key derivation function (KDF). Key derivation functions may include one or more iterations or instances of hash functions and/or other cryptographic operations in order to generate an encryption or decryption key. Examples of key derivation function may include but are not limited to any key derivation functions specified by Public Key Cryptography Standards (PKCS) (e.g., PKCS-5) or Adobe Password Security. In various embodiments, KDFs may be utilized by any of the various components described herein to generate public key-private key pairs.

Various portions of this detailed description may refer to "client(s)" and "server(s)" or similar terminology. For instance, various embodiments may include (among other elements) a client system or client device (or simply a "client"), an individualization server, and/or an authorized device group management server. It should be understood that the terms "client" and "server" do not impose any limitation on the operation, configuration, or implementation of such elements. It should be understood that these terms are used only as convenient nomenclature. Indeed, various embodiments are in no way limited by the principles of a conventional client-server architecture. For instance, any of the "clients" or "servers" described herein may be configured to communicate according to a variety of communication protocols or system architectures, such as a peer-to-peer (P2P) architecture or some other architecture, whether such architecture is presently known or developed in the future.

In various instances, this detailed description may refer to content (which may also be referred to as "content item(s)," "content data," "content information" or simply "data" or "information"). In general, content may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV) format or some other video file format whether such format is presently known or developed in the future.

In various embodiments, content may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content may include any combination of the above-described examples.

In various instances, this detailed disclosure may refer to consuming content or to the consumption of content, which may also be referred to as "accessing" content, "viewing" content, "listening" to content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Figure 9:
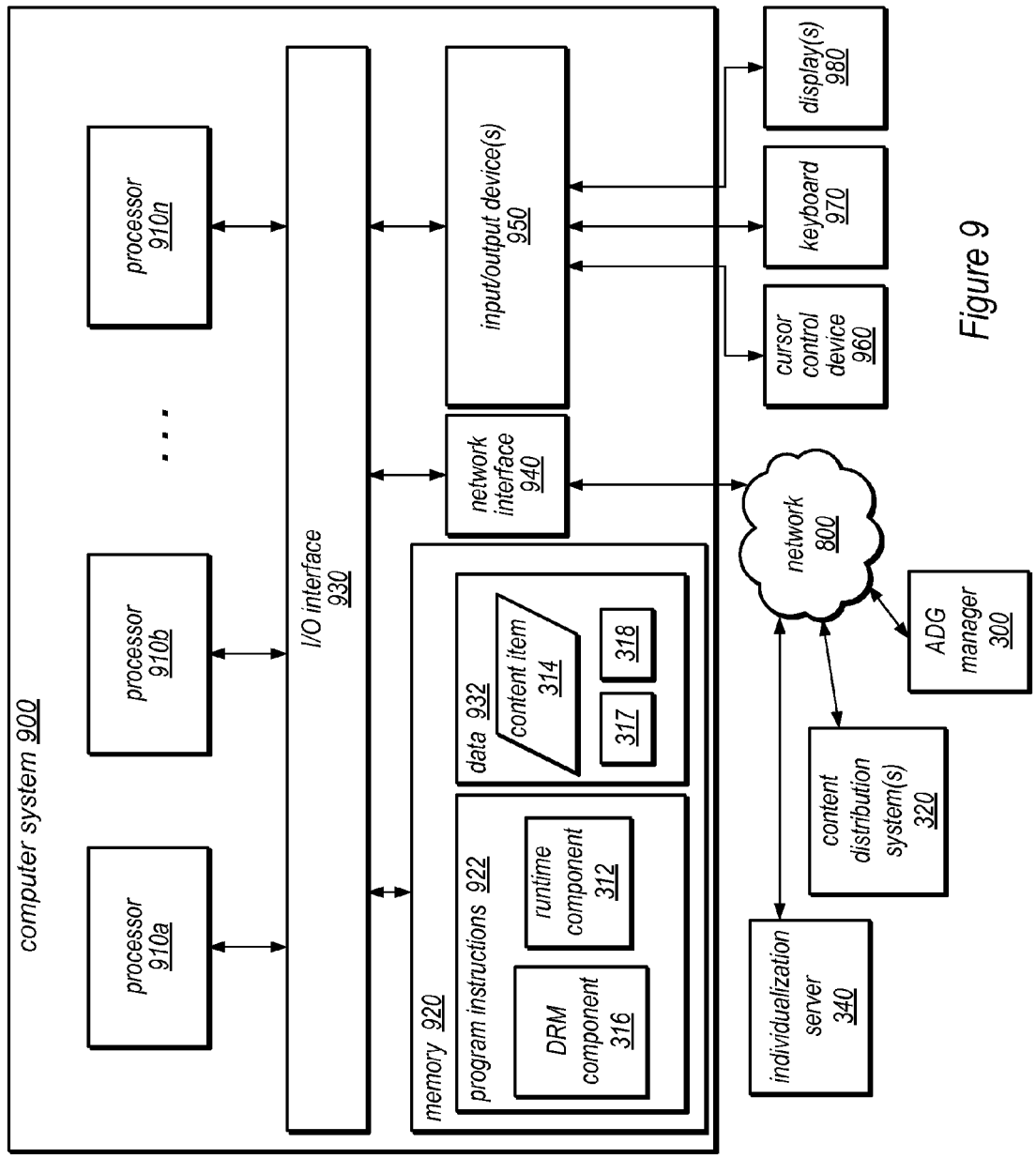
FIG. 9 illustrates an example computer system suitable for implementing various components of the system and method for digital rights management with authorized device groups, according to various embodiments.

In various instances, this detailed description may refer to a device on which content may be consumed. In various embodiments, such a device may include but is not limited to a computing system (e.g., a desktop or laptop computer), a digital audio or multimedia player (e.g., an MP3 player), a personal digital assistant (PDA), a mobile phone, a smartphone, an e-book reader, a digital photo frame, or any other device or system configured to access, view, read, write, and/or manipulate any of the content data described herein. Any of such devices may be implemented via a computer system similar to that described with respect to FIG. 9.

Note that in various instances the description presented herein may refer to a given entity performing some action. It should be understood that this language may in some cases mean that a system (e.g., a computer system) owned and/or controlled by the given entity is actually performing the action.

Note that in various instances the description presented herein may refer to a public key being associated with a private key or a public key corresponding to private key. It should be understood that such statements may mean that such a public key forms a public key-private key pair with such a private key. Additionally, in some cases, a public key-private key pair may be referred to as simply a "key pair." Note that in various embodiments, public key-private key pairs may be generated via one or more hash functions and/or one or more KDFs.

Introduction

Various embodiments of a system and method for digital rights management with authorized device groups ("ADGs") are described. The system and method for digital rights management with authorized device groups may include a digital rights management (DRM) framework for provisioning access to content to various devices (e.g., computer systems, mobile computing systems, etc.) based on a device's inclusion within an authorized device group ("ADG"). A given ADG may include multiple devices that have been authorized to access content items associated with that ADG. For example, a device may be authorized to join a an ADG by presenting a particular credential, such as a digital certificate signed by a trusted third party and/or a particular username and password combination (other examples are described in more detail below). In various embodiments, when a device is authorized to join an ADG, the device may be issued a private key associated with that private key. This private key may be utilized to decrypt content keys in order to access content encrypted with such content keys as described in more detail below.

In various embodiments, content may be associated with an ADG such that a device that is a member of that ADG may access the content. Content may be associated with an ADG by the manner in which the content is packaged and/or prepared for distribution. For instance, in various embodiments content may be encrypted with a content key (e.g., via a symmetric encryption process). This content key may be required to decrypt the content. Furthermore, this content key may be distributed along with the content (in a protected form). To associate the content with an ADG, the content key of the content may be encrypted with a public key associated with the ADG. Accordingly, in some embodiments, only devices that hold the private key corresponding to that public key may be able to determine the unencrypted version of the content key and thus decrypt the content encrypted with that content key. By controlling which ADG keys are used to encrypt the content keys of different content items and by controlling the devices that may hold such ADG keys, various embodiments may be configured to control which devices can control various content items.

FIG. 1 illustrates a logical representation of multiple ADGs and the content accessible by devices within such ADGs. In the illustrated embodiment, two ADGs 194 and 196 are illustrated. Content group 192 may be accessible to ADG 194 and content group 198 may be accessible to ADG 196. Note that while only two content groups and two ADGs are illustrated in FIG. 1, there may be any quantity of content groups and any quantity of ADGs in various embodiments. Additionally, in various embodiments a given content group may include any number of content items and a given ADG may include any number of devices.

In various embodiments, each ADG may be assigned a public key-private key pair. In some embodiments, this assignment may be performed by an ADG manager (described in more detail below). The aforesaid key pair may be utilized by a content packager (described in more detail below) to associate or "bind" a particular content item with a particular ADG and/or grant a particular device membership in a particular ADG. In some embodiments, a given ADG may be assigned multiple key pairs. For instance, multiple key pairs could be assigned to an ADG to support multiple different operating systems on client device (e.g., each key pair may correspond to a different operating system).

Binding Content to an ADG—The public key of an ADG's public key-private key pair may be utilized to bind a content item to that ADG. Note that in various embodiments content items may include encrypted content (e.g., encrypted video, encrypted audio, etc.) as well as a content encryption key that can be used to decrypt that encrypted content (see the content item of FIG. 2 for an example of the various data/information that may be stored within a content item). In the illustrated embodiment, that content encryption key may not be stored in clear form within the content item. Rather, the content encryption key is stored in an encrypted form. Moreover, the encryption key utilized to encrypt a content encryption key of a content item may limit that content item to a particular ADG (i.e., only devices of that ADG may be able to access that content item). By way of example, content item 102 may include encrypted content and an encrypted content encryption key. This content encryption key may be encrypted with the public key of the private key-public key pair associated with ADG 194. Accordingly, FIG. 1 illustrates content item 102 as being accessible to any of devices 150-156. In various embodiments, the reason that content item 102 is accessible to such devices is that devices 150-156 may hold the private key of the private key-public key pair assigned to ADG 194. Any of such devices (should they receive content item 102) would in various embodiments be able to use that private key to decrypt content item 102's content encryption key and use the decrypted content encryption key to decrypt the content itself. Note that content item 104 and content item 106 may be bound to ADG 194 in manner similar to that of content item 102. Additionally, content items 108-114 may be bound to ADG 196 in manner similar to that of the binding between content group 192 and ADG 194 (e.g., the content encryption keys of content items 108-112 may each be encrypted with the public key of the public key-private key pair assigned to ADG 196). Note that over time the constituent content items of a given content group may change (e.g., additional content items may be bound to an ADG).

While the description herein largely describes assigning a public key-private key pair to an ADG, it should be understood that in some embodiments a single symmetric encryption key may be used as a substitute for such key pairs. For instance, in such embodiments, a given ADG may be assigned a symmetric key. That symmetric key may be the same key distributed to members of the ADG as well as the key that encrypts the content key within a content license (e.g., at packaging time), as described in more detail below. In such embodiments, a client device that holds such symmetric key (e.g., a client device that is a member of the ADG) may be configured to decrypt content keys with that symmetric key (and thus decrypt the content encrypted with such content keys).

Managing Device Membership in an ADG—The private key of an ADG's public key-private key pair may be utilized to grant a device entry into an ADG. To grant a given device entry into a particular ADG, an ADG manager (described in more detail below) or another system may provide the given device the private key of the public key-private key pair assigned to that particular ADG. In some embodiments, the possession of this private key by a device may indicate that the device is a member of the corresponding ADG. Note that in some embodiments, various conditions must be met before the provisioning of an ADG's private key to a particular device. In one example, the device may need to provide proof of identity or perform some other authentication-related task. For instance, the device may need to provide credentials, such as a digital certificate signed by a trusted third party and/or a particular username and password combination.

By way of example, device 158 may have gained membership within ADG 196 by obtaining the private key of the public key-private key pair corresponding to ADG 196. By virtue of possessing that private key, device 158 may be configured to decrypt the encrypted content encryption key of a content item of content group 198 and use that decrypted encryption key to decrypt the content (e.g., video, audio, etc.) within that content item. Any of devices 154-172 may have gained membership within ADG 196 in a similar manner. Similarly, devices 150-156 may have gained membership within ADG 194 by obtaining the private key of the public key-private key pair assigned to ADG 194.

In various embodiments, a given device may be a member of multiple ADGs and thus may access content of multiple content groups. For example, in the illustrated embodiment, device 154 and device 156 are each members of ADG 194 and ADG 196 (which means that they may be configured to decrypt content items of content group 192 and content group 198. For instance, device 154 and device 156 may each have obtained the private key assigned to ADG 194 as well as the private key assigned to ADG 196. Additionally, in some embodiments, some devices may not be members of any ADG and thus may not be able to decrypt content bound to ADGs. For instance, device 180-184 in the illustrated embodiment may not be able to decrypt content items of content group 192 nor content group 198.

Figure 2:
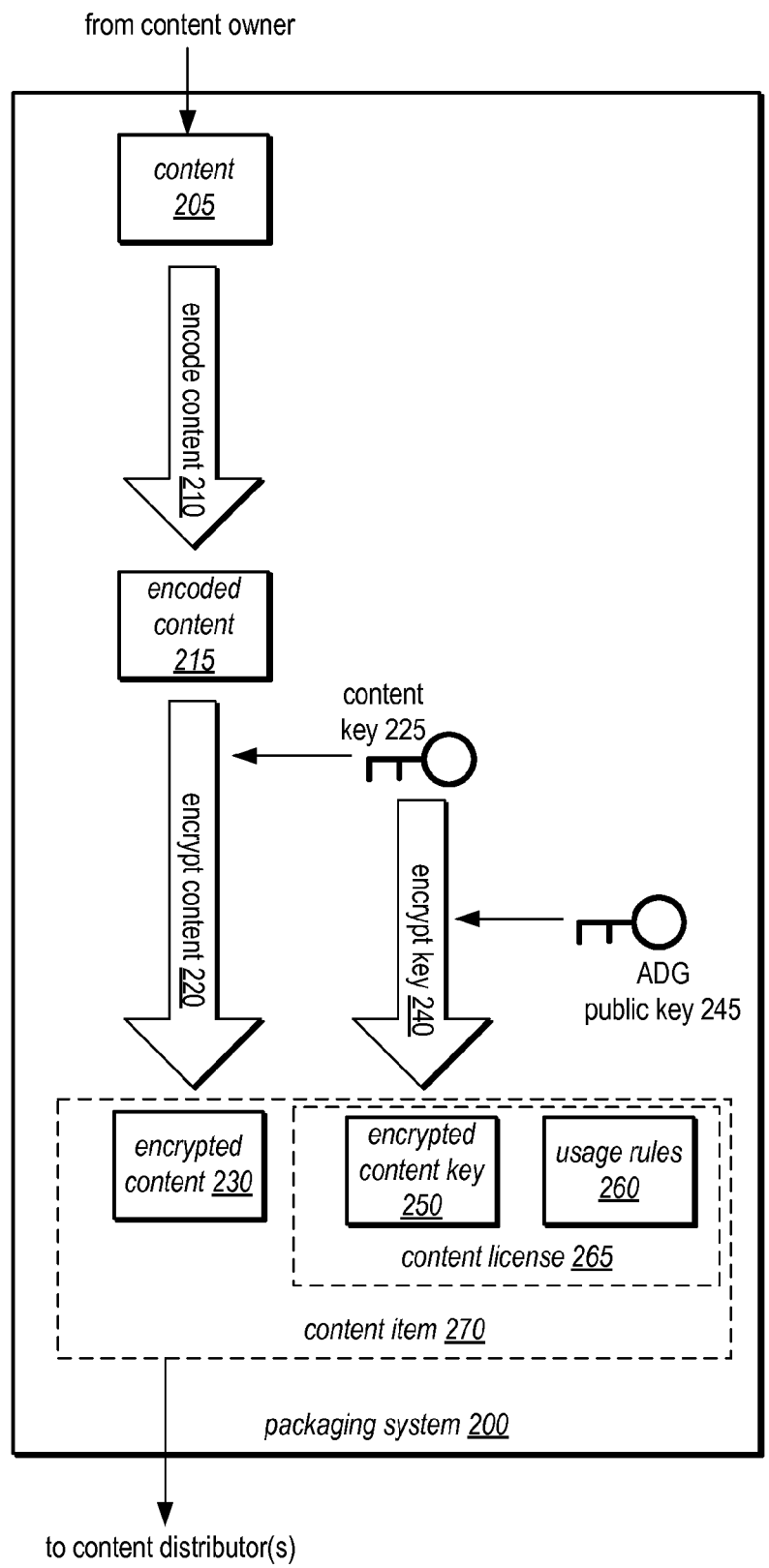
FIG. 2 illustrates a block diagram of a content packaging system, according to various embodiments.

FIG. 2 illustrates the operation of a packaging system 200 mentioned above. Note that in some embodiments content 205 may be but need not be obtained from a content owner, as illustrated. In some embodiments, packaging system 200 may be operated by such a content owner (e.g., an entity that holds rights, such as intellectual property rights, on one or more portions of content). For instance, a content owner might utilize packaging system 200 to restrict access of particular content to devices of a particular ADG. In some cases, packaging system 200 might be implemented by a third party entity designated by the content owner. Note that in various embodiments, packaging system 200 may be implemented by a computer system, such as the computer system described with respect to FIG. 9.

In the illustrated embodiment, packaging system 200 may perform various operations to package content 205 (e.g., video, audio, etc.) as content item 270. For example, in some embodiments, packaging system 200 may include encoding logic configured to perform an encoding logic 210 on content 205 to generated encoded content 215. In various embodiments, packaging system 200 may encode content 205 according to various codecs (e.g., video compression codecs, an example of which includes video codecs utilized to generate Adobe® Flash® Video files). Note that in some embodiments the encoding described above is optional. While not illustrated, in some embodiments, packaging system 200 may embed additional information within content 205 to generate encoded content 215. In one example, packaging system 200 may embed advertising data or information that, at consumption time, is consumed along with the data. For instance, a ticker advertisement or some other advertising data could be added to a video stream. In some embodiments, the packaging process described herein may be implemented as a component of any of the content distribution systems described herein. In some embodiments, content packaging may be performed prior to streaming data from a streaming server, one example of which includes Adobe® Flash® Media Streaming Server.

Packaging system 200 may also be configured with logic for performing an encryption process on encoded content 215 (or content 205 if no encoding is performed) as illustrated by encryption logic 220. In various embodiments, the encryption performed on encoded content 215 by the packaging system may include a symmetric encryption process. Content key 225 may be the encryption key that packaging system 200 may utilize to encrypt encoded content 215. In various embodiments, content key 225 may be generated by packaging system 200 via one or more cryptographic hash functions and/or one or more KDFs. The result of the above-described encryption is illustrated as encrypted content 230. Packaging system 200 may include or embed encrypted content 230 within content item 270.

Packaging system 200 may also be configured with logic to encrypt content key 225 for inclusion within content item 270. For instance, encryption logic 240 may be utilized to encrypt the content key 225. In various embodiments, encrypting content key 225 may include asymmetric encryption. In various embodiments, packaging system 200 may be configured to select an ADG public key 245 with which to encrypt content key 225. In various embodiments, this selection may determine to which ADG the content item may be bound (similar to the binding described above with respect to FIG. 1). For instance, in the illustrated embodiment, content item 270 may be bound to the ADG that has been assigned a public key-private key pair that includes ADG public key 245. By way of example, if ADG public key 245 were the public key of the public key-private key pair assigned to ADG 194 of FIG. 1, content item 270 would in various embodiments become a member of content group 192, which may be accessible to the devices of ADG 194 (since such devices may possess the corresponding public key for decrypting the encrypted content key). Likewise, if ADG public key 245 were the public key of the public key-private key pair assigned to ADG 196 of FIG. 1, content item 270 would in various embodiments become a member of content group 198, which may be accessible to the devices of ADG 196 (since such devices may possess the corresponding public key for decrypting the encrypted content key). Also note that in various embodiments encrypted content key 250 (e.g., the result of encrypting content key 225 with ADG public key 245) may be included or embedded within content item 270 whereas the unencrypted content key 225 may not be included within content item 270. In some embodiments, a content item may belong to multiple ADGs. For instance, the content packager may encrypt the content license of a content item with multiple keys associated with different ADGs.

In some embodiments, the packaging system may select the particular ADG public key 245 with which to encrypt content key 225 (and thus select which ADG the content item 270 will be bound) based on information received from an ADG manager (described in more detail below). For instance, packaging system 200 may be configured to query ADG manager for the public key of a particular ADG; the ADG manager may be configure to provide that public key to the packaging system in response to that request. By way of example, a particular ADG may be comprised of devices that are equipped with a particular executable application or runtime component. Packaging system 200 might query the ADG manager for the public key that corresponds to such an executable application or runtime component; the ADG manager may be configured to provide the appropriate public key in response to such query. By utilizing such public key to encrypt content key 225, packaging system 200 may ensure that only devices equipped with the appropriate executable application or runtime component will be able to consume content item 270. Some examples of such an executable application or runtime component include Adobe® Flash® Player and Adobe® AIR®. In another example, packaging system 200 may query the ADG manager for a public key associated with a content subscription; additional details about utilizing such a subscription-based model for forming ADGs is described with respect to the ADG manager of FIG. 3 below.

In addition to the functionality described above, packaging system 200 may also be configured to apply usage rules 260 to the content. In some embodiments, this may include embedding usage rules 260 within content item 270 such that a consumption component (e.g., a video or audio player) or a DRM component may be access and enforce such usage rules at content consumption time. In various embodiments, usage rules 260 may include any restrictions on the use, access, or consumption of the content including but not limited to restricting the access of content to a particular time period (e.g., a rental time period or some other time period), restricting the actions (e.g., view, copy, save, distribute, etc.) that can be performed with respect to the protected content, and/or some other restriction on the content (e.g., a restriction might ensure content be viewed with embedded advertising content).

Note that in various embodiments packaging system 200 may generate content item 270 such that the content item includes a data structure representing a content license, such as content license 265. In some cases, the data structure representing content license 265 may be similar to or the same as those utilized by license servers of conventional systems. Also note that in contrast to conventional systems that distribute content license by a license server sometime after the content packaging process is performed, various embodiments package a content license along with corresponding content together as a single content item. According to various embodiments, a computer system that receives the content does not need to retrieve a content license at or after content acquisition time since the license may already be included along with the content when the content is acquired. Also note that in some embodiments, an encrypted content key as well as usage rules may be included within the content item without the use of a content license 265.

Note that in various embodiments content item 270 may be a particular data structure that includes data representing usage rules 260, encrypted content 230, encrypted content key 250, and/or content license 265. However, in other cases, content item 270 may be a loose collection of such elements not necessarily bound by the same data structure. For instance, in some embodiments, it would be possible to obtain such elements separately in time and/or from separate sources.

In various embodiments, content items may include other information or metadata not illustrated. For instance, in some embodiments, content items may include information for obtaining an ADG private key for the content, such as a network address of an appropriate ADG management server (e.g., ADG management server 300, described below). Other metadata included within the content item might indicate one or more codecs (e.g., video or audio codecs) required to de-encode the content of the content item and/or network locations from which to obtain such codecs.

Note that while FIG. 2 illustrates the packaging of only one content item, packaging system 200 may be configured to package multiple content items in the manner described. In various embodiments, multiple systems configured in the manner of packaging system 200 may be utilized to package multiple content items. Any of such content items may be provided to one or more content distributors in some embodiments, as illustrated.

Figure 3:
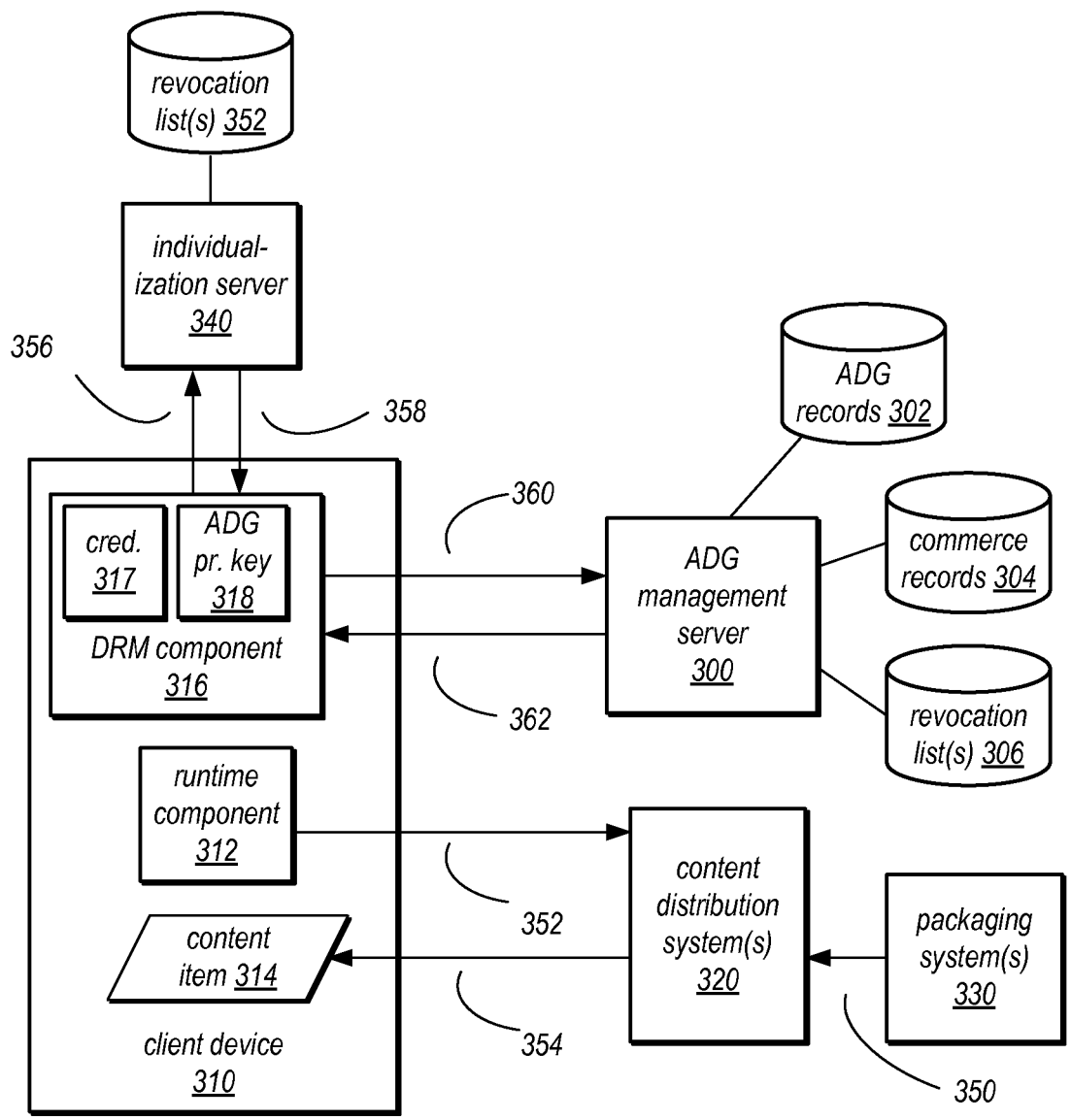
FIG. 3 illustrates a block diagram of a DRM framework for implementing various embodiments of the system and method for digital rights management with authorized device groups.

FIG. 3 illustrates a flow diagram including the acquisition of content and the obtainment of an ADG private key for that content. In the illustrated embodiment, single instances of systems 310, 320, 330 and 340 are shown. It should be noted that in various embodiments, multiple ones of such systems are possible and contemplated. For instance, multiple client device's 310 may obtain content and associated ADG private keys via the techniques described herein (see e.g., devices 150-172 of FIG. 1). Various embodiments may also include multiple different ADG management servers (or simply "ADG managers") configured in a manner similar to that of ADG management server 300. For instance, in various embodiments a given ADG manager may be responsible for managing one or more respective ADGs.

While not illustrated, it should be noted that subsequent content acquisitions of content corresponding to the same ADG may not require client device 310 to re-obtain the private key for that ADG (as long as that private key has not expired or the device has not been revoked). For instance, in various embodiments, the private key for that ADG may be cached locally on client device 310. Unlike conventional systems that rely on a content license acquisition process separate from the acquisition of content and/or rely on a content license acquisition process performed after the acquisition of content, the ADG private key acquisition (corresponding to a particular ADG) may in some cases be performed only once for multiple content items. For instance, client device 310 obtain a private key for a particular ADG and use that same private key to gain access to multiple different acquired content items (e.g., by using the ADG private key to decrypt each content item's encrypted content encryption key and using the decrypted content encryption key to decrypt the content of that content item).

Content Acquisition Private Key Acquisition and Content Decryption

As illustrated at 350, packaging system(s) 330, which may be configured in the manner similar to or the same as packaging system 200, may provide various content items to content distribution system(s) 320 (either directly or through one or more intermediary systems). In various embodiments, content distribution system(s) 320 may include one or more content distribution networks (CDNs) or other systems optimized for the high-speed transfer of data such as multimedia content (e.g., video, audio, etc.).

Client device 310 may include a runtime component configured to request a content item (as illustrated at 352) as well as a DRM component 326 configured to perform DRM-related activities on behalf of client device 310. Note that in various embodiments runtime component may request a content item (e.g., a video stream or file) from an e-commerce portal (e.g., a website or other network-accessible resource configured to provide users with various product listings of items or services offered as the basis for a transaction as well as components for completing such a transaction). In some cases, the content may be provided directly to the client device or the runtime component may be redirected (e.g., via hyperlink) to the appropriate content distribution system 320 from which to obtain the content item. In any case, client device 310 may obtain one or more content items, such as content item 314, in response to the runtime component's request (as illustrated at 354). Some examples of runtime component 312 include Adobe® Flash® Player and Adobe® AIR®. In various embodiments, content item 314 may be structured in a manner similar to or the same as content 270 described above. For instance, content item 314 may include encrypted content, an encrypted content key, usage rules and/or a content license. Note that in various embodiments content item 314 may be file that is received in its entirety (or near entirety) before content consumption is attempted or content item 314 may be a stream of data, such as video and/or audio streamed from the Internet or another network location. Also note that in various embodiments, runtime component 312 may be dynamically obtained by client device 310. For instance, runtime component 312 may be a plug-in (e.g., plug-in of a web browser), application extension, or some other program component obtained by client device 310.

Runtime component 312 may be configured to coordinate with DRM component 316 for any of various DRM-related functions. For instance, runtime component 312 may evaluate content item 314 and determine that client device needs a particular ADG private key to consume the content (in other cases, this evaluation may be performed by the DRM component). Accordingly, runtime component 312 may in various embodiments enlist the services of DRM component to obtain such private key and perform other DRM-relate operations. Note that if the appropriate ADG private key has already been obtained and is cached locally, there may be no need to retrieve that key again in various embodiments. Also note that in some embodiments, the functionality of DRM component 316 and runtime component 312 may be integrated together as a single component.

In some embodiments, DRM component 316 may obtain credentials prior to retrieving the private key of the ADG corresponding to the content item. (Note that the type of ADG private key and/or the location from which to obtain such key may be indicated by metadata within content item 314 in some embodiments.) (Also note that in some embodiments one or more ADG keys may be embedded within client devices at manufacturing time, as described in more detail below.) One way in which DRM component 316 may obtain credentials is illustrated at 356 and 358. For instance, at 356, DRM component 316 may contact an individualization server configured to "individualize" client device, which may in some cases mean providing device-specific credentials specific to that client device. For example, request 356 may be a request for such credentials; the request may also include device specific information for client device 310 (e.g., a processor identifier, motherboard identifier, network interface identifier, machine serial number, and/or any other identifying information or combination of identifying information of client device 310). In some cases, device specific information about client device 310 may include information identifying DRM component 316 and/or runtime component 312 (e.g., application identifiers, application version numbers, etc.). In some cases, the device specific information in the request may not be transmitted in clear form (e.g., such information may be hashed with a hash function). Individualization server 340 may be configured to evaluate request 356 and determine whether to issue device-specific credentials to client device 310. For instance, individualization server 340 may ensure that client device 310 is not listed as a revoked system in revocation list(s) 352. Note that revocation list(s) 352 may include lists of devices known to be compromised, untrustworthy, or otherwise unsuitable for receiving credentials. In response to determining that the client device has not been revoked, individualization server may, at 358, provide client device 310 with device-specific credentials 317, which may in some cases include information based on the device-specific information provided at 356. In some embodiments, credentials 317 may include a device specific private key for client device 310 and a corresponding device specific public key for client device 310. In some cases, such credentials may include a digital certificate that includes such public key along with an identifier of client device 310. Note that this identifier may in various embodiments be based on the device-specific information, such as a hash of the device-specific information. One example of such a digital certificate may include an X.509 certificate. In various embodiments, such a digital certificate may be digitally signed by a trusted third party; such signing may signify the validity of the relationship between client device 310 and its public key (e.g., so that other entities can rely on the use of that public key for secure data transmission).

DRM component 316 may utilize device-specific credentials 317 to obtain the appropriate ADG private key for content item 314. For example, at 360, DRM component 316 may submit a request for the ADG private key from ADG management server. In some cases, the particular ADG manager to contact may be specified by metadata within content item 314. Request 360 may include at least a portion of device specific credentials 317 described above. For instance, the request may include a device-specific digital certificate that includes a device-specific public key and an associated identifier of the device. In various embodiments, request 360 may indicate to the ADG manager that the client device is attempting to join an authorized device group managed by ADG manager 300. As described above, any device that is a member of a particular ADG (e.g., any device granted the private key for that ADG) may be able to consume content associated with that ADG (e.g., any content protected by the public key for that ADG).

ADG management server 300 may evaluate request 360 to determine whether client device 310 is authorized to join the authorized device group. In various embodiments, this evaluation may include comparing the credentials provided at 360 to ADG records 302 to determine whether the records indicate that a device holding such credentials is allowed or authorized to become a member of the ADG managed by ADG manager 300. In one example, credentials 317 may establish that client device 310 is equipped with a particular executable application or runtime component (e.g., examples of which include Adobe® Flash® Player and Adobe® AIR®) and ADG records 302 may indicate that a device equipped with such executable application or runtime component is allowed to join the ADG managed by ADG manager 300. For instance, such an indication may specify that the ADG manager 300 is permitted to issue the private key for that ADG (e.g., private key 318) to client device 310 (as illustrated by result 362). In some embodiments, such executable applications or runtime components may be trusted by various content owners. Accordingly, a content owner could utilize a packaging system (e.g., packaging system 200) to bind their content to one of such trusted applications (e.g., by packaging content with the public key associated with the ADG). For example, a content owner may package content that includes embedded advertising. In order to prevent such advertising from being stripped or removed from the content, the content owner may utilize the packaging process to bind the content to an ADG that includes devices with applications that are trusted not to alter content (e.g., trusted not to remove advertising from content).

In some embodiments, in addition to or as an alternative to evaluating request 360 against ADG records 302, ADG management server 300 may evaluate request 360 against commerce records 304. For instance, ADG manager 300 may evaluate request 360 to determine whether the client device is associated with a user (and/or controlled by a user) that holds a valid subscription for one or more content items. For example, in addition to device credentials 317, request 360 (or a subsequent message associated with request 360) may include information for verifying the existence of such a valid subscription including but not limited to account identifiers (e.g., an account number), user identifiers (e.g., a username), passwords, pass-phrases, personal identification numbers (PINs), or any other information related to proving that an entity holds a particular subscription or other account. ADG manager 300 may be configured to compare such information to commerce records 304, which may indicate a plurality of entities (e.g., user and/or devices) and, for each of such entities, the associated subscriptions (or other commerce arrangements) to which the entity is subscribed. In response to determining that the request includes the requisite information for establishing proof of a particular content subscription, the ADG manager may issue the private key for its managed ADG to the client system (e.g., private key 318), as illustrated by response 362. In this way, a content owner may in various embodiments utilize ADGs to provision access to subscription content. For instance, a content owner may package all content of a particular subscription with the public key of the ADG managed by the ADG manager 300; in turn the ADG manager 300 may in various embodiments ensure that only devices associated with entities that hold such a subscription are given the private key to that ADG.

In various embodiments, ADG management server 300 may determine whether a client is to be admitted into and ADG based on device authentication (e.g., authenticating a device based on device-specific credentials or keys), based on software authentication (e.g., authenticating a device based on credentials or keys assigned to software components of the client device), based on user authentication (e.g., based on username/password combinations or other user-specific information), based on a network address of the client device (e.g., an Internet Protocol address), or some combination thereof.

In various embodiments, membership within an ADG may be granted for various periods of time. For instance, in some cases, membership may be granted indefinitely. In some cases, membership may only be granted for a specified time period. After such time period, a client device may in some cases be required to request membership again. Such an implementation may in various embodiments be utilized to implement the subscription-based authentication described above.

In various embodiments, in response to determining that client device 310 is authorized to join a particular ADG, ADG manager 300 may send DRM component 316 the private key corresponding to that particular ADG (as illustrated at 362). This private key may in various embodiments provide client device 310 with the ability to access any content protected by the corresponding public key (e.g., any content from the corresponding content group, such as described above with respect to FIG. 1). In various embodiments, ADG manager 300 may send the private key of the ADG to the DRM component of the client device in encrypted form. In some cases, the ADG manager 300 may utilize a public key specific to client device 310 to encrypt the private key of the ADG. Note that this device-specific public key may be retrieved from request 360 (e.g., retrieved from a digital certificate within request 360, which may be a digital certificate issued by the individualization server. By performing the aforesaid encryption, ADG manager 300 may ensure that only the particular client device 310 will be able to decrypt and determine the request, which includes the private key for the particular ADG managed by ADG manager 300. For instance, the particular client device may be the only device that holds the corresponding device-specific private key (e.g., from credentials 317). The DRM component of the client device may utilize such private key to decrypt response 362 and determine the private key for the ADG.

To decrypt content item 314, DRM component 316 may decrypt an encrypted content key in content item 314 with the private key received from ADG manager 300. The DRM component 316 may decrypt the content with that decrypted content key. In various embodiments, DRM component 316 may provide the decrypted content to runtime component 312 for consumption. For instance, runtime component 312 may de-encode (e.g., de-encode with a video codec, such as codecs for de-encoding data files adhering to Adobe® Flash® Video (.FLV) format) the decrypted content for consumption on client device 310 (e.g., video/audio playback, etc.). In various embodiments, DRM client 316 may be configured in a manner similar to the DRM component described below with respect to FIG. 4. In various embodiments, the runtime component may generate representation of the content on a display (e.g., display 980 of FIG. 9) and/or generate a representation of such content via one or more audio speakers.

Figure 4:
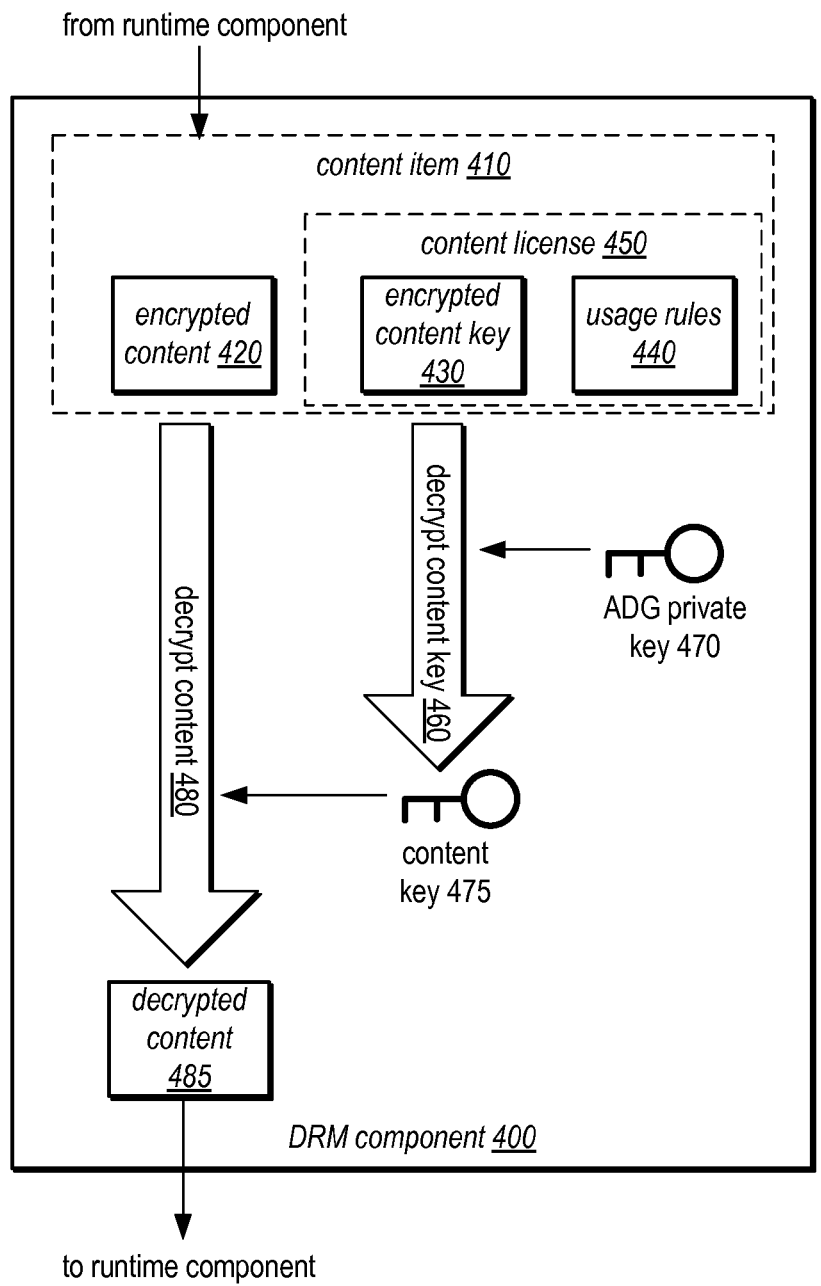
FIG. 4 illustrates an example of a DRM component, according to various embodiments.

FIG. 4 illustrates one example of a DRM component configured to decrypt content items subsequent to obtaining an ADG private key, such as ADG private key 470 (which may be obtained in a manner similar to that described above with respect to FIG. 3). As illustrated, DRM component 400 may obtain a content item 410 (e.g., from the runtime component). Content item 410 may include encrypted content 420, encrypted content key 430, and usage rules 440, any of which may be similar to the like-named elements of FIG. 2. As illustrated at 460, DRM component 400 may include logic for decrypting encrypted content key 430 with ADG private key 470 to generate a decrypted content key 475 (which may be equivalent to the content key that was originally used to encrypt encrypted content 420). Note that in various embodiments the decryption of the content key in this manner may only be successful if ADG private key 470 corresponds to the public key used to create the encrypted content key at packaging time. As illustrated at 480, DRM component 400 may include logic for decrypting encrypted content 420 with the decrypted content key 475 (e.g., via a symmetric decryption process) to generate decrypted content 485. While not illustrated, if this decrypted content is encoded (e.g., via one or more audio or video codecs), DRM component 400 may also be configured to de-encode the content. In other cases, such a de-encoding process may be left to other components, such as the runtime component described above. As illustrated, DRM component 400 may be configured to provide decrypted content to one or more other components of a client device, such as a runtime component (which may consume the content). Also note that in some cases the DRM component and the runtime component may be integrated together in a single functional component.

In various embodiments, the techniques described herein may be applied to enable the superdistribution of content (e.g., the transfer of content from user to user, such as on storage medium including but not limited to Universal Serial Bus memory devices or Compact Discs). For instance, in some embodiments, one or more ADG keys may be embedded into devices, such as at manufacturing time. In these cases, such a device may be configured to, without obtaining an ADG via a network connection, consume content (associated with the ADGs associated with the keys embedded within the device at manufacturing time) distributed via superdistribution.

Key Rollover

Figure 5:
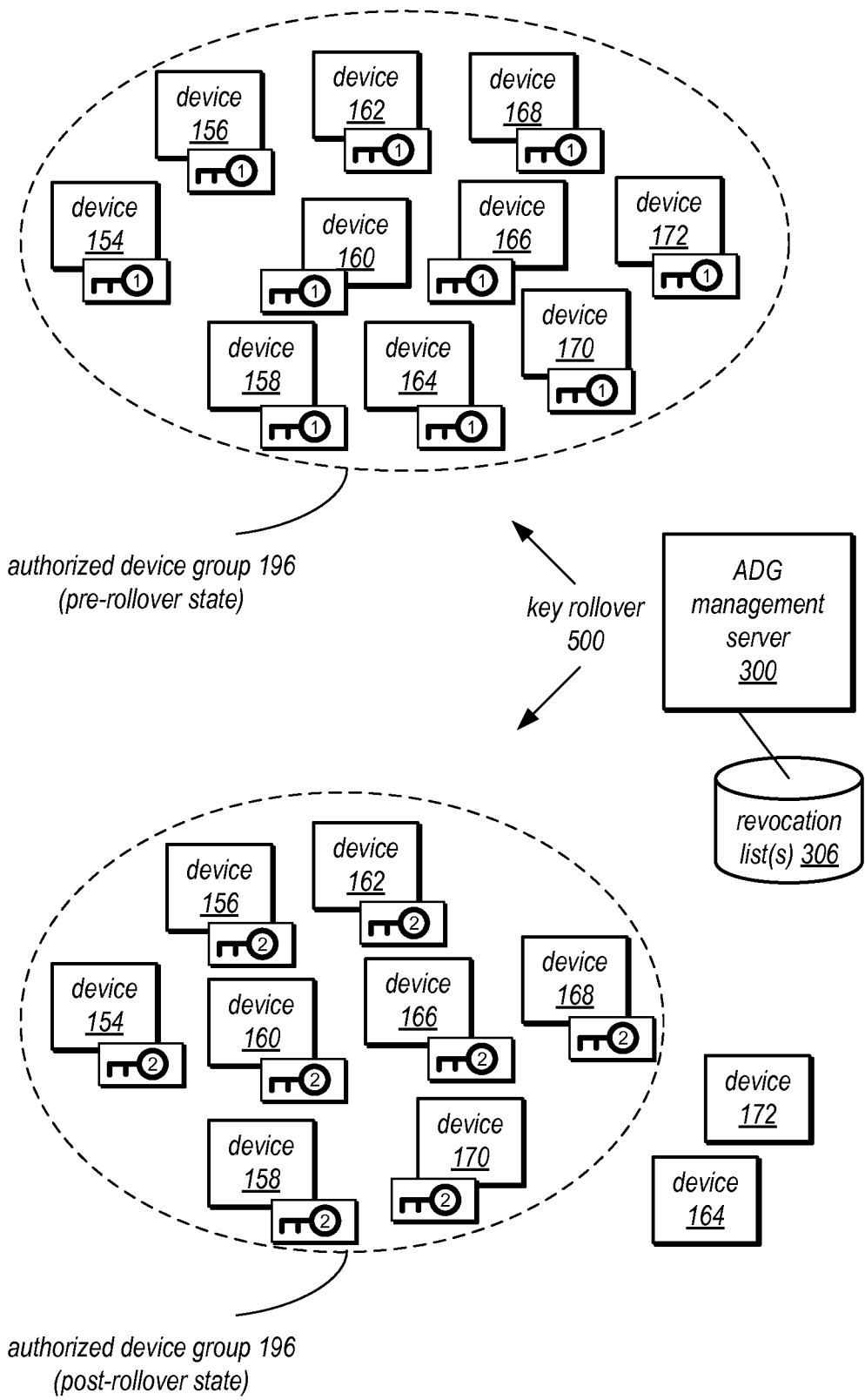
FIG. 5 illustrates one example of key rollover performed by an authorized device group manager, according to various embodiments.

FIG. 5 illustrates an example key rollover process performed by ADG manager 300. In various embodiments, key rollover may include updating (e.g., replacing) the private key issued to an ADG. Various embodiments of the key rollover process described herein may be performed in a manner that excludes one or more device from receiving the updated (or "rolled-over") key. For instance, in response to determining that one or more devices in an ADG are no longer trusted, key manager 300 may be configured to remove such devices from that ADG.

As illustrated in FIG. 5, ADG manager 300 may be configured to perform key rollover process 500, which is described in more detail below. FIG. 5 also illustrates two different states of the same ADG, namely ADG 196, which is described above with respect to FIG. 1. The first of such states is illustrated as a pre-rollover state where each of devices 154-172 may be members of ADG 196. For instance, as illustrated, each of devices 154-172 includes a private key for the particular ADG managed by ADG manager 300. As described above, devices may be added to an ADG if such devices provide appropriate credentials or other information (described with respect to FIG. 3, for example). In the illustrated embodiment, a key rollover process may be implemented by key manager 300 in order to remove one or more devices from an ADG. ADG manager 300 may determine which, if any, device to remove based one or more removal criteria including but not limited to receiving knowledge that a particular device can no longer be trusted (e.g., the device has been compromised from a security standpoint), receiving knowledge that a device's credentials are have expired, and/or receiving knowledge that subscription associated with the device (or associated with a user of that device) has expired. In some cases, devices that can no longer be trusted are specified by revocation lists 306 and ADG manager 300 may be configured to remove such devices from an ADG via the key rollover process.

As illustrated, the post-rollover state of ADG 196 may no longer include one or more devices from the pre-rollover state of the ADG. In the illustrated embodiment, device 164 and device 172 are no longer members of ADG 196. The manner in which device manager 300 removed such devices from ADG 196 may include but is not limited to invalidating the old ADG private key, assigning a new ADG private key to the ADG, and issuing the new private key to members of the ADG while selectively excluding certain devices of the ADG. In the illustrated embodiment, ADG manager 300 may selectively exclude device 164 and device 172 by not issuing the new ADG key to such devices. ADG manager 300 may be configured to perform such exclusion in response to determining that device 164 and device 172 are identified by revocation list 306, for example.

ADG manager 300 may be configured to selectively provide updated ADG private keys via a variety of techniques. In some embodiments, a given device of the ADG may periodically or aperiodically request a new private key for the ADG to which it is a member (e.g., send another request similar to 360 of FIG. 3. Such embodiments may ensure that a device's credentials (e.g., credential 317) are valid at the time new keys are distributed to the ADG. For instance, when the devices of an ADG submit new requests for updated ADG private keys, the ADG manager may reject such requests from device with credentials that have expired. In some embodiments, DRM component may perform a check at content consumption (e.g., playback) time. For instance, the DRM component may ensure that the client device holds the proper ADG private key for the content. If the client device does not hold the correct private key or holds an expired private key for the ADG, the DRM component may submit a new request for that private key (e.g., a request similar to request 360 described above).

In some embodiments, DRM manager 300 may utilize broadcast encryption to selectively provide update keys to devices of a particular ADG. For instance, DRM manager 300 may generate a block of cryptographic data and provide such data to each (or a large number) of the devices of a particular ADG. Each DRM component of such devices may be configured to, based on respective device credentials (such as credentials 317), perform a unique set of calculations to arrive at the same private key common to multiple devices the ADG. The exception to this scenario may include DRM manager 300 selectively blocking certain devices (e.g., revoked or untrustworthy devices) by structuring the aforesaid block of cryptographic data in such a way that prevents such devices from arriving at the private key common to multiple devices of the ADG.

In some embodiments, content items may be updated in response to a key rollover. For instance, in some cases, a key rollover that updates the private key for a particular ADG may invalidate the previous public key for that ADG. Since the content encryption keys of various content items may be encrypted with such public key (which may now be expired), various embodiments may include performing a light weight repackaging of content items. In various embodiments, this light-weight re-packaging process may be performed by a packaging system (e.g., packaging system 200) or a content distribution system (e.g., content distribution system 320) on content items that have not yet been distributed to client devices. For content items already distributed to client devices, the DRM components may be configured to re-acquire such content items subsequent to the light-weight re-packaging process being performed on such items. In other cases, the DRM component may maintain a history of older ADG private keys that can be used to decrypt content items already present on the client device. In various embodiments, the light-weight repackaging process may not require the content of a content item to be re-encrypted. Instead, in some embodiments, only the encrypted content key of the content item may need to be decrypted using the old ADG private key and then re-encrypted using the new ADG public key. In various embodiments, this process may be less computationally intensive than re-encrypting all of the content (e.g., a video or audio stream).

Client Device Content Distribution

Various embodiments may employ techniques to prevent a client device from sharing its acquired content items with other client devices. For instance, for a given acquired content item, the DRM component of a client device may decrypt the content item's encrypted content key and then re-encrypt that key with a device specific key (e.g., a key from credentials 317). In this way, even if such content item is distributed to other client devices, those devices would not be able to access the content in such content item (e.g., since that client device would not have the requisite device-specific decryption key to decrypt the content key for the content). In this way, various embodiments may prevent unauthorized access of distributed content items.

Various embodiments may employ techniques to enable client devices within the same ADG to share content items with each other. For instance, in some embodiments, client devices of the same ADG may share content items according to one or more P2P protocols. As long as the content shared is protected by the public key associated with that ADG, a client device within that ADG may decrypt the content key of the shared content with the private key associated with that ADG (and thus be able to decrypt the content itself by virtue of determining the content key). In other embodiments, protocols or techniques other than P2P may be utilized to distribute content between peers of the same ADG.

Other Considerations

In various embodiments, instead of utilizing credentials obtained through individualization (e.g., credentials 317), the DRM component of a client device may utilize credentials included within the stored representation of that DRM component (e.g., credentials inserted into DRM component by a software vendor that creates the DRM component). In some cases, this may provide a less desirable framework in terms of revocability and renewability (e.g., it may be harder change a credential inserted into the DRM credential by the software vendor than it is to update a device credential provided by an individualization server). Nevertheless, this technique may be utilized in some embodiments.

Example Methods

The system and method for digital rights management with authorized device groups may include various methods, some examples of which are described below. In various embodiments, the methods described herein may be implemented by elements of the DRM framework described above. For instance, FIG. 6 described below may be implemented by a DRM component (e.g., DRM component 316 of FIG. 3). Additionally, FIG. 7 may be implemented by an ADG manager (e.g., ADG manager 300 of FIG. 3).

Figure 6:
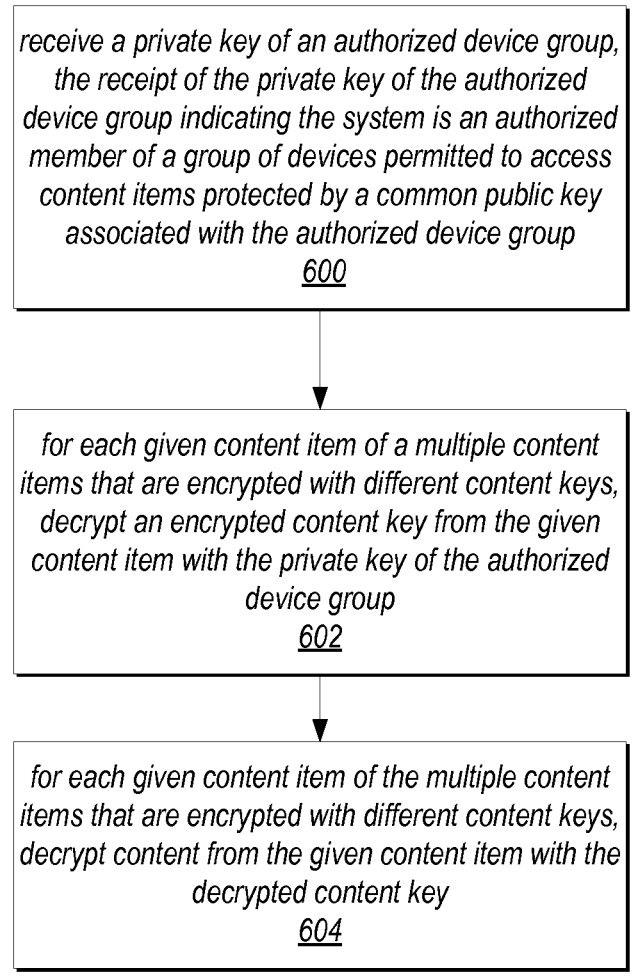
FIG. 6 illustrates a flowchart of an example method that may be performed by a DRM component, in various embodiments.

FIG. 6 illustrates a flowchart of an example method for obtaining an ADG private key and decrypting content utilizing that ADG private key. As illustrated by block 600, the method may include receiving a private key of an authorized device group (e.g., receiving a private key as described above with respect to 362); the receipt of the private key of the authorized device group may indicate that a system (e.g., a system implementing the method, such as client device 310) is an authorized member of a group of devices (e.g., ADG 194 or 196) permitted to access content items protected by a common public key associated with the authorized device group (e.g., content groups 192 and 198 described above). As illustrated by block 602, the method may also include, for each given content item of a multiple content items that are encrypted with different content keys (e.g., multiple different content items configured similar to content item 314 described above), decrypting an encrypted content key from the given content item with the private key of the authorized device group (e.g., decrypting a content key utilizing the techniques described above with respect to FIG. 4). As illustrated by block 604, the method may also include, for each given content item of the multiple content items that are encrypted with different content keys, decrypting content from the given content item with the decrypted content key (e.g., decrypting a content key utilizing the techniques described above with respect to FIG. 4).

Figure 7:
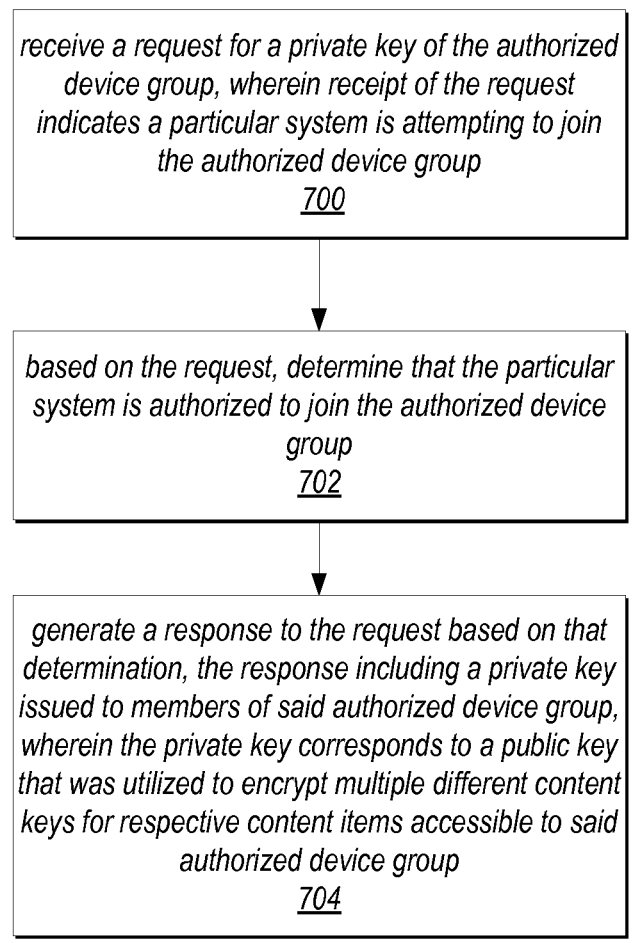
FIG. 7 illustrates a flowchart of an example method that may be performed by an authorized device group manager, in various embodiments.

FIG. 7 illustrates a flowchart of an example method for the provisioning of a private key for an ADG according to various embodiments. As illustrated by block 700, the method may include receiving a request for a private key of the authorized device group (e.g., a request similar to request 360 described above); the receipt of the request may indicate a particular system (e.g., client device 310) is attempting to join the authorized device group (e.g., the authorized device group managed by ADG manager 300). As illustrated by block 702, the method may also include based on the aforesaid request, determining that the particular system is authorized to join the authorized device group (e.g., performing operations similar to those described above with respect to the evaluation of request 360). As illustrated by block 704, the method may also include generating a response to the request based on the aforesaid determination (e.g., generating a response similar to that of response 362); the response may include a private key issued to members of the authorized device group (e.g., a private key similar to that included in response 362). The private key may correspond to a public key that was utilized to encrypt multiple different content keys for respective content items accessible to the authorized device group.

Example System Configuration

Figure 8:
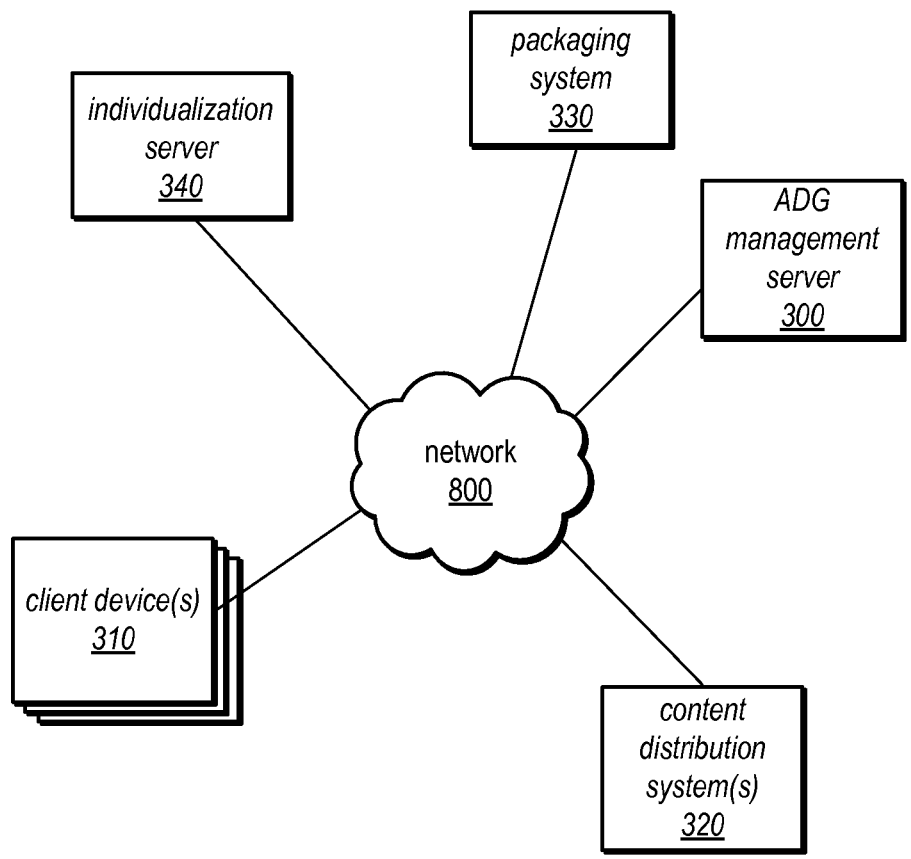
FIG. 8 illustrates an example system configuration suitable for implementing various components of the system and method for digital rights management with authorized device groups, according to various embodiments.

Various embodiments of the system and method for digital rights management with authorized device groups may be configured according to different system configurations. One example of such a system configuration is illustrated by the system of FIG. 8. In the illustrated embodiment, each of the elements of the DRM framework described above is implemented as elements of respective computer systems. Each of the illustrated computer systems may in various embodiments communicate via a network, such as network 800. Network 800 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, each illustrated element may be a computer system configured to implement the respective components described above via hardware and/or software. Note that any of the elements illustrated in FIG. 8 may be implemented via one or more computer systems, such as the example computer system described below with respect to FIG. 9.

Example Computer System

Various embodiments of a system and method for digital rights management with authorized device groups, as described herein, may be executed on one or more computer systems, which may interact with various other devices. One such computer system is computer system 900 illustrated by FIG. 9, which may in various embodiments implement any of the elements illustrated in FIGS. 1-8. Computer system 900 may be configured to implement a DRM component 316 and/or a runtime component 312, which may be stored in memory as processor-executable program instructions 922. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, data 932 may include encrypted content (content item 314) or decrypted content as described above as well as device specific credentials 317 and an ADG private key 318. In various embodiments, program instructions 922 may be executable by the processor(s) to implement DRM component 316 and/or runtime component 312. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the DRM framework (as described above), may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 800), such as other computer systems (e.g., individualization server 340, content distribution system 320, and ADG manager 300), or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the methods described above, such as the method illustrated by FIGS. 6-7. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the embodiments described herein may be practiced with other computer system configurations.

Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device comprising:
one or more processors; and
memory coupled to the one or more processor, the memory comprising instructions executable by the one or more processors to implement a digital rights management (DRM) component configured to:
generate a request for a private key; the request comprising a credential specific to the device;
receive the private key of an authorized device group, the receipt of the private key of the authorized device group indicating the device is an authorized member of a group of devices permitted to access content items protected by a common public key associated with the authorized device group; and
for each content item of a plurality of content items that are encrypted with different content keys:
decrypt an encrypted content key from the encrypted content item with the private key of the authorized device group, the encrypted content key having been distributed with the encrypted content item; and
decrypt content from the encrypted content item with the decrypted content key;
responsive to a determination to exclude the device from the authorized device group:
receive a block of cryptographic data, the block being broadcast to the device, the block structured in such a way that prevents the device from calculating an update private key common only to devices within the authorized device group, wherein the block is structured in such a way based on credentials of the device and on a set of calculations the device performs to arrive at private keys common to devices in the authorized device group; and
calculate the new private key that excludes the device from the authorized device group.

2. The device of claim 1, wherein said credential comprises a digital certificate issued by a trusted third party.

3. The device of claim 2, wherein said digital certificate comprises a device-specific public key specific to said device.

4. The device of claim 3, wherein said private key of the authorized device group is received in an encrypted form encrypted with said device-specific public key, wherein said DRM component is configured to determine an unencrypted version of the private key of the authorized device group by decrypting that private key with a device-specific private key specific to said device.

5. The device of claim 1, wherein said program instructions are further configured to implement an application configured to consume content decrypted by the DRM component.

6. The device of claim 5, wherein to consume the content, the application is configured to generate a representation of said content on a display.

7. A system comprising:
one or more processors; and
memory coupled to the one or more processors, the memory comprising instructions executable by the one or more processors to implement an authorized device group manager of an authorized device group, the authorized device group comprising a plurality of devices authorized by the authorized device group manager, the authorized device group manager configured to:
receive a request for a private key of the authorized device group, receipt of the request indicating a client device is attempting to join the authorized device group;
based on the request, determine that the client device is authorized to join the authorized device group;
responsive to the determination, generate a response to the request the response comprising a private key issued to members of said authorized device group, the private key corresponding to a public key that was utilized to encrypt multiple different content keys distributed with respective encrypted content items accessible to said authorized device group; and
revoke the membership of a particular device of the devices in the authorized device group, wherein to revoke is to:
generate a block of cryptographic data, the block structured in such a way that prevents the device from calculating an update private key common only to devices within the authorized device group, wherein the block is structured in such a way based on credentials of the device and on a set of calculations the device performs to arrive at private keys common to devices in the authorized device group; and
broadcast the update private key to the devices in the authorized device group.

8. The system of claim 7, wherein the request for the private key of the authorized device group comprises a device-specific digital certificate including a public key specific to the client device.

9. The system of claim 8, wherein to determine that the client device is authorized to join the authorized device group, the authorized device group manager is configured to determine whether said device-specific digital certificate is digitally signed by a trusted third party.

10. The system of claim 8, wherein the authorized device group manager is configured to encrypt the response with the public key from the digital certificate.

11. The system of claim 7, wherein to revoke the membership of said particular device, the authorized device group manager is configured to:
invalidate said private key of the authorized device group; and
provide a new private key for the authorized device group only to devices within the authorized device group other than said particular device.

12. A computer-implemented method comprising:
performing, by one or more processors:
generating a request for a private key, the request comprising a credential specific to a device;
receiving the private key of an authorized device group, receipt of the private key of the authorized device group indicating the device is an authorized member of a group of devices permitted to access content items protected by a common public key associated with the authorized device group; and
for each content item of a plurality of content items that are encrypted with different content keys:
decrypting an encrypted content key from the encrypted content item with the private key of the authorized device group, the encrypted content key having been distributed with the encrypted content item; and
decrypting content from the encrypted content item with the decrypted content key;
responsive to a determination to exclude the device from the authorized device group:
receiving a block of cryptographic data, the block being broadcast to the device, the block structured in such a way that prevents the device from calculating an update private key common only to devices within the authorized device group, wherein the block is structured in such a way based on credentials of the device and on a set of calculations the device performs to arrive at private keys common to devices in the authorized device group; and
calculating the new private key that excludes the device from the authorized device group.

13. The method of claim 12, wherein said credential comprises a digital certificate issued by a trusted third party.

14. The method of claim 13, wherein said digital certificate comprises a device-specific public key specific to said device.

15. The method of claim 14, wherein said private key of the authorized device group is received in an encrypted form encrypted with said device-specific public key, wherein the method comprises determining an unencrypted version of the private key of the authorized device group by decrypting that private key with a device-specific private key specific to said device.

16. A computer-implemented method comprising:
performing, by one or more processors:
receiving a request for a private key of the authorized device group, receipt of the request indicating a client device is attempting to join the authorized device group;
based on the request, determining that the client device is authorized to join the authorized device group;
generating a response to the request based on that determination, the response comprising a private key issued to members of said authorized device group, the private key corresponding to a public key that was utilized to encrypt multiple different content keys distributed with respective encrypted content items accessible to said authorized device group; and
revoking, the membership of a particular device of the devices in the authorized device group, the revoking comprising:
generating a block of cryptographic data, the block structured in such a way that prevents the device from calculating an update private key common only to devices within the authorized device group, wherein the block is structured in such a way based on credentials of the device and on a set of calculations the device performs to arrive at private keys common to devices in the authorized device group; and
broadcasting the update private key to the devices in the authorized device group.

17. The method of claim 16, wherein the request for the private key of the authorized device group comprises a device-specific digital certificate including a public key specific to the client device.

18. The method of claim 17, wherein to determine that the client device is authorized to join the authorized device group, the method comprises determining whether said device-specific digital certificate is digitally signed by a trusted third party.

19. The method of claim 16, wherein revoking the membership of the particular device further comprises:
invalidating said private key of the authorized device group; and
providing a new private key for the authorized device group only to devices within the authorized device group other than said particular device.

20. One or more computer-readable storage memories comprising instructions executable by one or more processors in a device to implement a DRM component configured to:
generate a request for a private key; the request comprising a credential specific to the device;
receive a private key of an authorized device group, the receipt of the private key of the authorized device group indicating the device is an authorized member of a group of devices permitted to access content items protected by a common public key associated with the authorized device group; and
for each content item of a plurality of content items that are encrypted with different content keys:
decrypt an encrypted content key from the content item with the private key of the authorized device group, the encrypted content key having been distributed with the encrypted content item; and
decrypt content from the encrypted content item with the decrypted content key;
responsive to a determination to exclude the device from the authorized device group:
receive a block of cryptographic data, the block being broadcast to the device, the block structured in such a way that prevents the device from calculating an update private key common only to devices within the authorized device group, wherein the block is structured in such a way based on credentials of the device and on a set of calculations the device performs to arrive at private keys common to devices in the authorized device group; and
calculate the new private key that excludes the device from the authorized device group.

21. The one or more computer-readable storage memories of claim 20, wherein said credential comprises a digital certificate issued by a trusted third party.

22. The one or more computer-readable storage memories of claim 21, wherein said digital certificate comprises a device-specific public key specific to said device.

23. The one or more computer-readable storage memories of claim 22, wherein said private key of the authorized device group is received in an encrypted form encrypted with said device specific public key, wherein said DRM component is configured to determine an unencrypted version of the private key of the authorized device group by decrypting that private key with a device-specific private key specific to said device.

24. One or more computer-readable storage memories comprising instructions executable by one or more processors to implement an authorized device group manager of an authorized device group, the authorized device group comprising a plurality of devices authorized by the authorized device group manager, the authorized device group manager configured to:
receive a request for a private key of the authorized device group, the receipt of the request indicating a client device is attempting to join the authorized device group;
based on the request, determine that the client device is authorized to join the authorized device group;
generate a response to the request based on that determination, the response comprising a private key issued to members of said authorized device group, the private key corresponding to a public key that was utilized to encrypt multiple different content keys distributed with respective encrypted content items accessible to said authorized device group; and
revoke the membership of a particular device of the devices in the authorized device group, the revocation comprises:
generate a block of cryptographic data, the block structured in such a way that prevents the device from calculating an update private key common only to devices within the authorized device group, wherein the block is structured in such a way based on credentials of the device and on a set of calculations the device performs to arrive at private keys common to devices in the authorized device group; and
broadcast the update private key to the devices in the authorized device group.

25. The one or more computer-readable storage memories of claim 24, wherein the request for the private key of the authorized device group comprises a device-specific digital certificate including a public key specific to the client device.

26. The one or more computer-readable storage memories of claim 25, wherein to determine that the client device is authorized to join the authorized device group, the authorized device group manager is configured to determine whether said device-specific digital certificate is digitally signed by a trusted third party.

* * * * *